United States Patent Office 3,327,521
Patented June 27, 1967

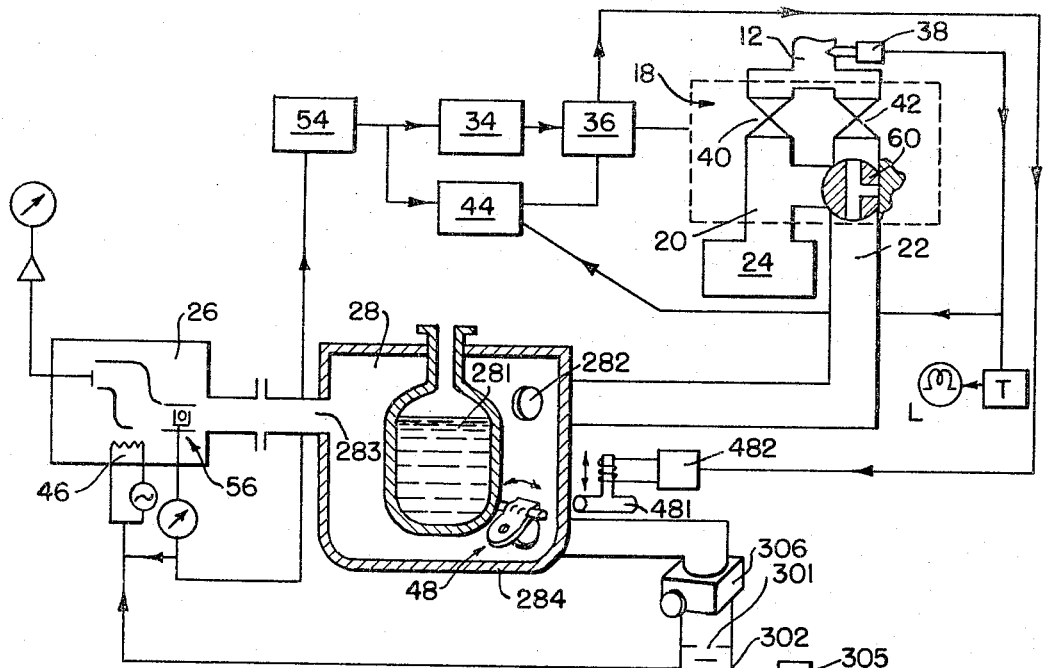
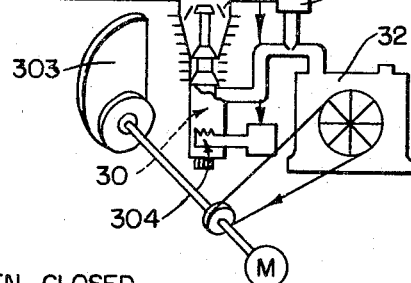
FIG. 2
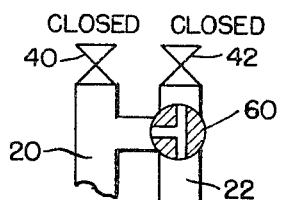
FIG. 2A
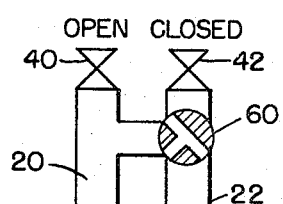
FIG. 2B
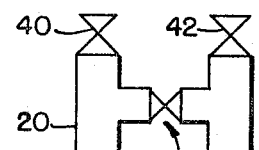
FIG. 2D
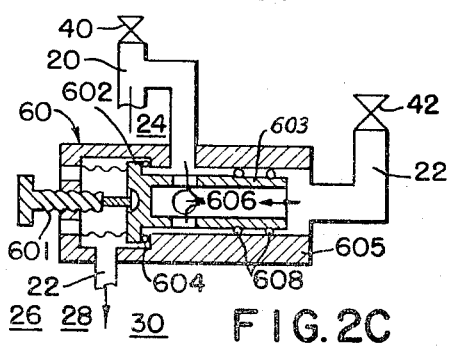
FIG. 2C
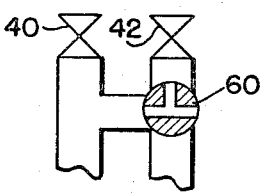
FIG. 2E June 27, 1967 W. E. BRIGGS 3,327,521
LEAK DETECTOR AND VACUUM PUMPING STATION
Filed Dec. 6, 1965 7 Sheets-Sheet 3
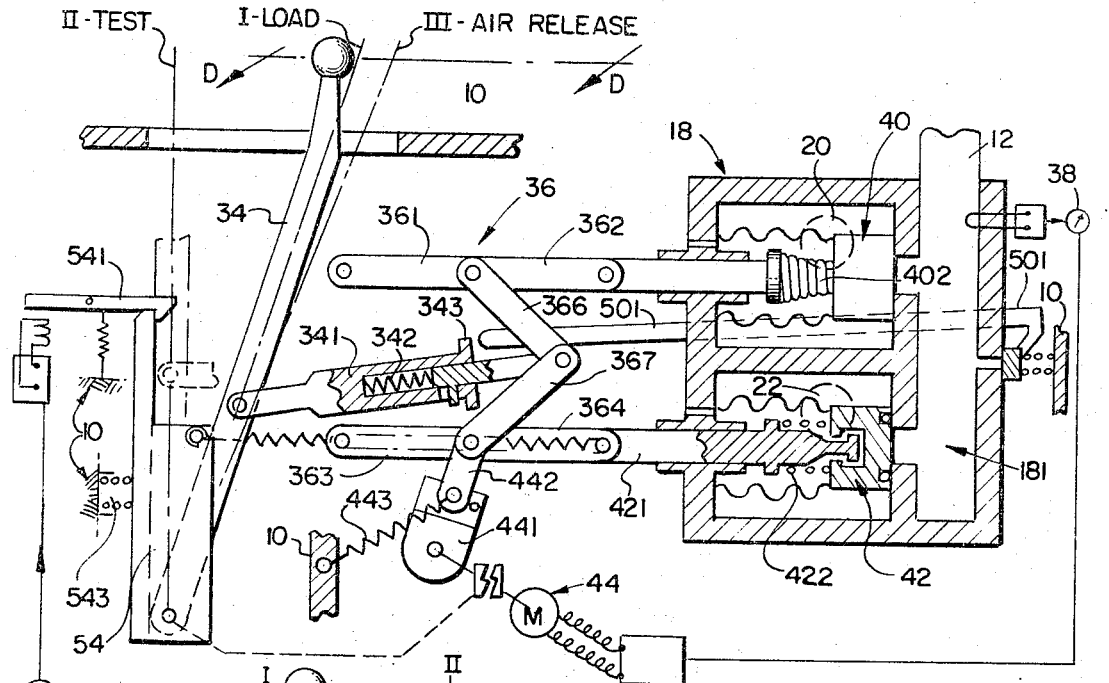
FIG. 3
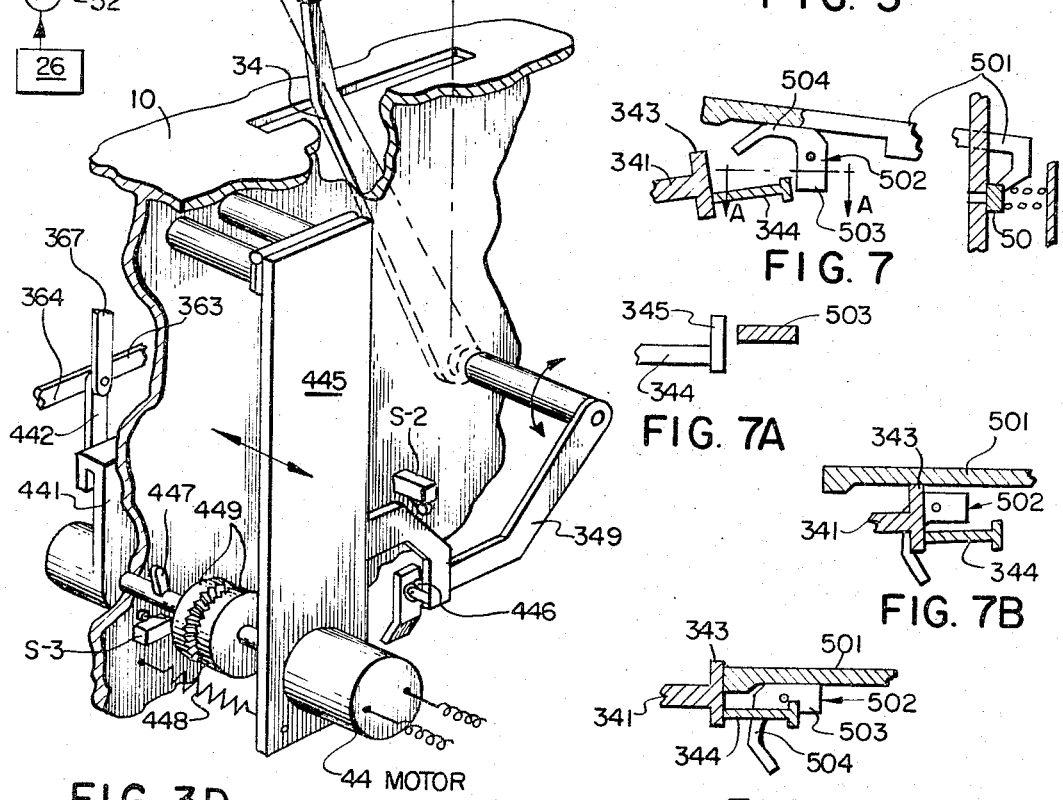
FIG. 3D
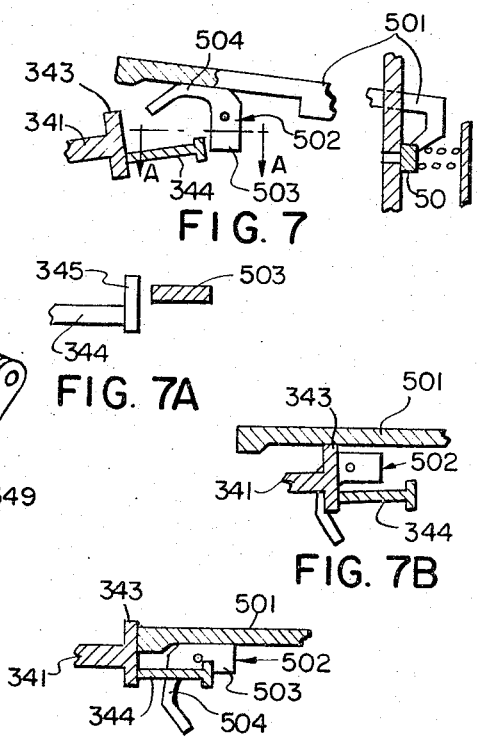
FIG. 7
FIG. 7A
FIG. 7B
FIG. 7C

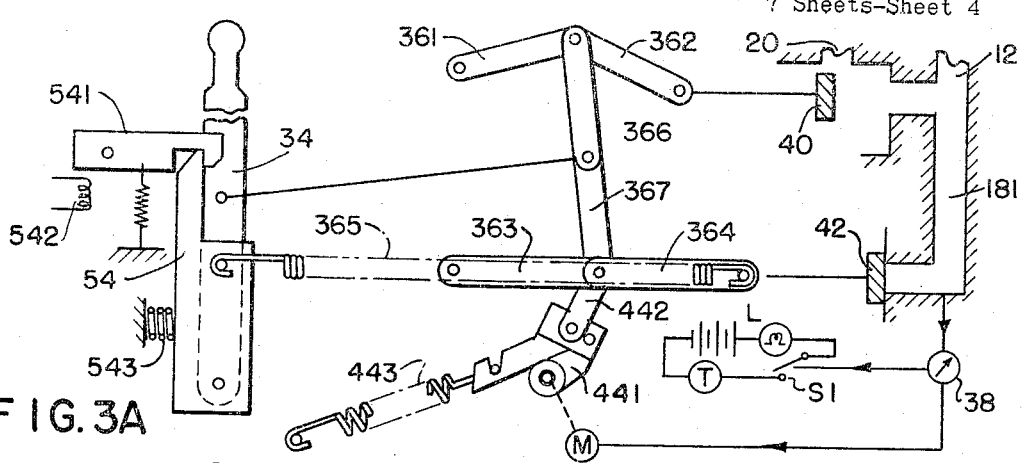
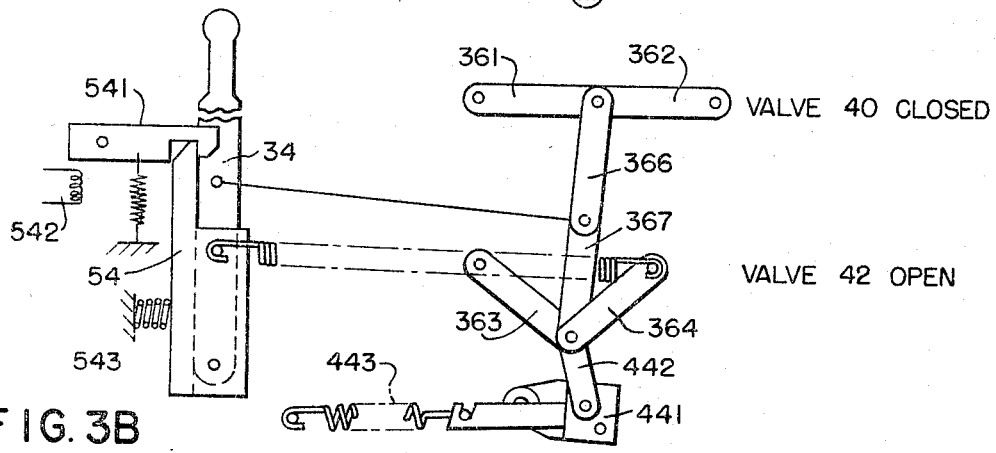
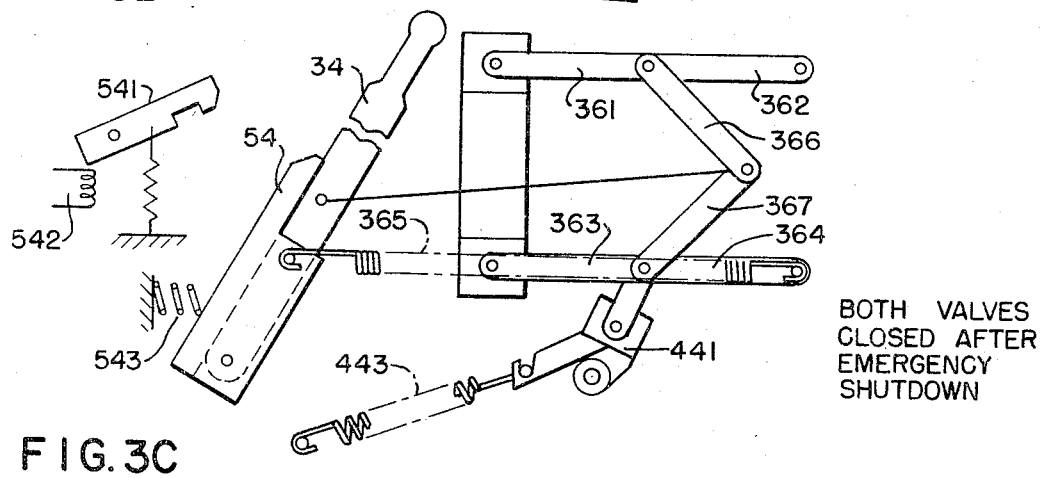

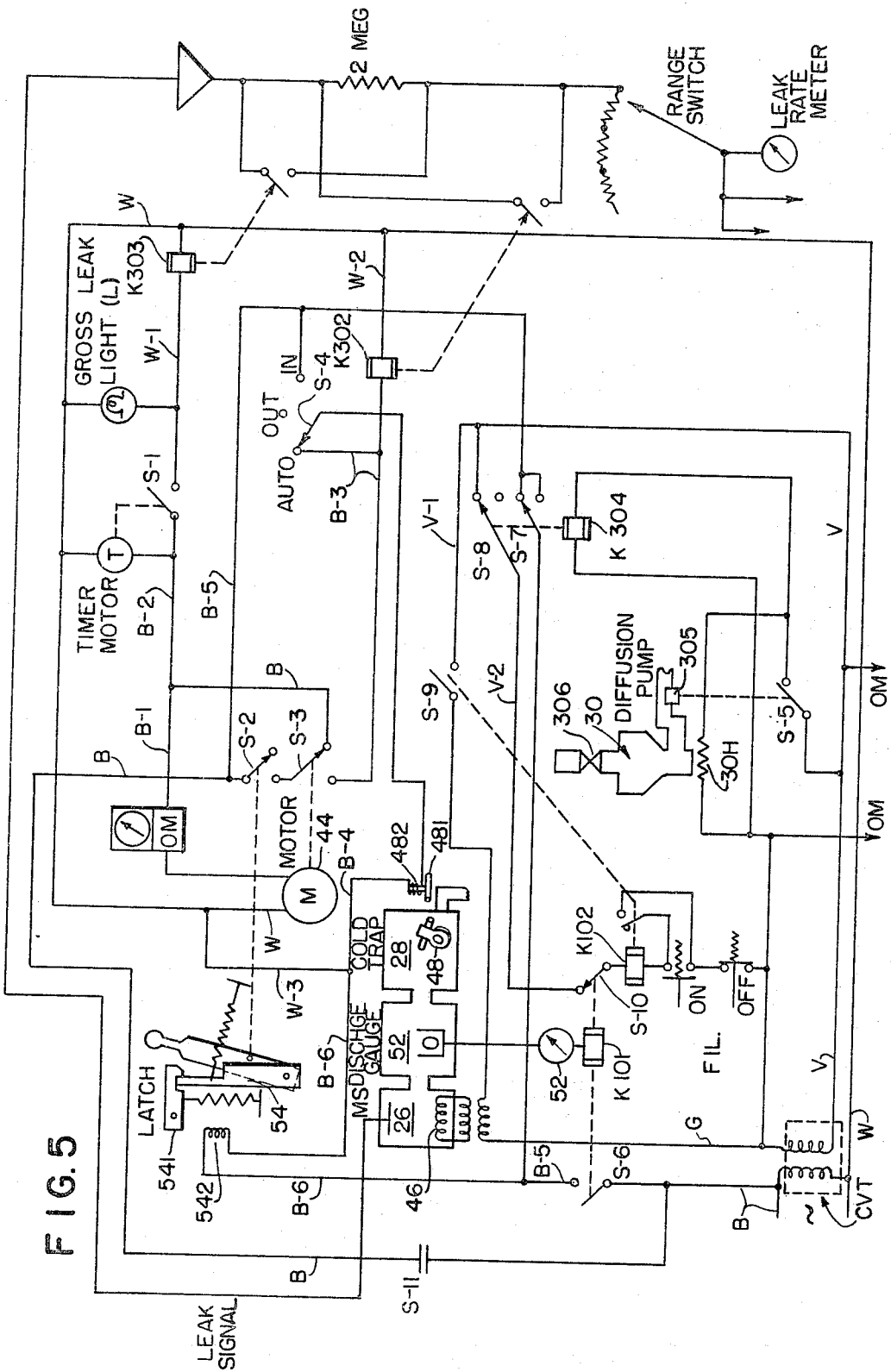

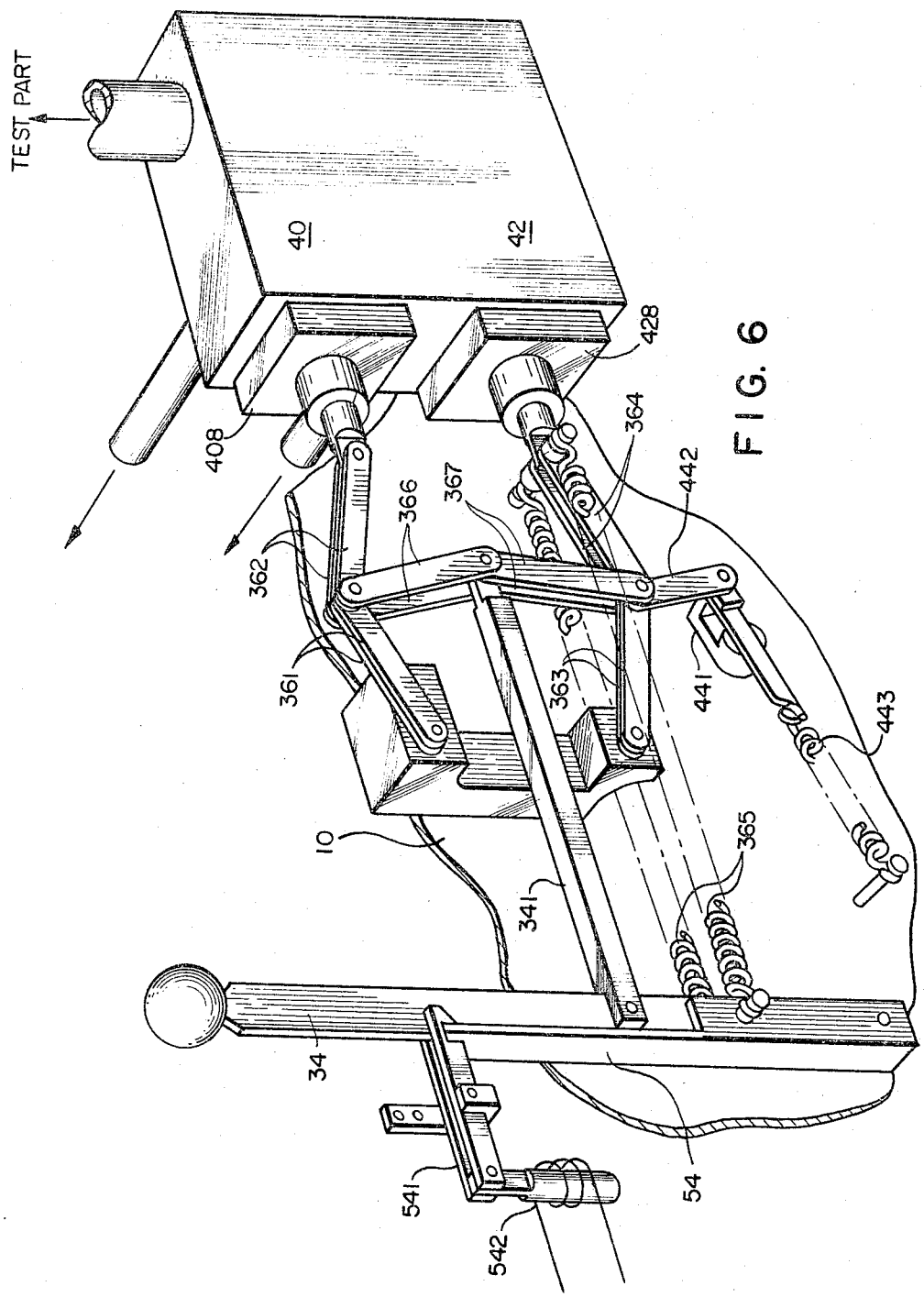

3,327,521
LEAK DETECTOR AND VACUUM PUMPING STATION
Walton E. Briggs, Lynnfield, Mass., assignor to National Research Corporation, Cambridge, Mass., a corporation of Massachusetts
Filed Dec. 6, 1965, Ser. No. 511,847
16 Claims. (Cl. 73—40.7)

ABSTRACT OF THE DISCLOSURE

A leak detection instrument which utilizes toggle linkages in a multiple-valve vacuum system control. The linkage is characterized by a manual opening of a first valve for rough pumping and a motor driven closing of the first valve and opening of a second valve, with slow transition, for fine vacuum pumping and leak detection operation.

---

This is a continuation-in-part of my copending application S.N. 406,508, filed Oct. 26, 1964 and now abandoned. Reference to other relevant copending applications is made in the general description which appears below.

BACKGROUND

The present invention relates to leak detection test instruments. Leak detection instruments are used in manufacturing industries for testing the leak tightness of a wide variety of components which must be operated under pressure or vacuum, including such diverse apparatus as transistors, refrigeration gear and space simulating chambers. The instrument generally comprises (a) a mass sensitive member such as a mass spectrometer, with a main vacuum pumping system for the member and (b) an auxiliary vacuum pumping station consisting of a mechanical roughing pump and a valve system for selectively connecting the test object to the roughing pump and then to the mass sensitive member. While the test object is connected to the member through the valve system, a trace gas, e.g., helium or a halogen, is sprayed over the exterior surface of the test object. If there is a leak in the object, the trace gas will enter through the leak into the test object and then through the valve system to the mass sensitive member which will provide an electric current signal indicative of the leak rate.

Prior art leak detection instruments are described, for example, in U.S. Patents 2,486,199, 2,504,530, 2,550,498, 2,855,777, 2,884,591, 2,897,437 and 3,026,715.

GENERAL DESCRIPTION

The present invention provides a leak detection instrument which utilizes toggle linkages in a unique vacuum system multiple valve arrangement to provide control of the sequence of valving. A first valve opens to connect the rough pump to the test object. Then a second valve opens to connect the mass sensitive member to the test object while the first valve closes. A deliberate slow transition from one valve connection to the other is afforded by this linkage for improved vacuum performance of the instrument. Yet, the linkage is capable of transmitting a rapid closing motion to both valves for emergency shutdown. Also provided in this invention are (a) novel provision for testing gross leaks by using the above-described first and second valves in combination with a combined throttle bypass, (b) automatic variation of effective pumping speed to improve the sensitivity of the instrument during actual testing and restore maximum speed at all other times, (c) simple straight-line stick shift control of the above-described first and second valves, as well as an air release valve for the instrument; and (d) consistent vacuum tight seating of the above first and second valves despite repeated cyclic usage. Related patent applications, in addition to the above-cited parent case, are (1) my copending application S.N. 433,093 filed Feb. 16, 1965, which describes a distinctly advantageous valving structure particularly useful in the gross leak testing combination [(a) above]; (2) the copending application of Briggs and Bassan, S.N. 503,744 filed Oct. 23, 1965, which describes an improved form of the above first and second valves and the actuating linkage therefor which limits wear and extends the lifetime of the system; (3) the copending application of Briggs and Sheldon, S.N. 512,649 filed Dec. 9, 1965, which describes a novel electrical circuit, particularly useful in leak detection instruments; and U.S. Patents 3,265,890 and 3,277,295, showing a preferred form of mass sensitive member for use in leak detection instruments. The above applications and patents are cited to show improvements which may be incorporated into my basic invention, described herein, and to more fully show the context in which my invention is best utilized.

OBJECTS

It is the principal object of the present invention to provide a leak detection instrument having improved life and ease of operation and maintenance compared to the prior art devices.

It is a further object of the invention to provide a leak detection instrument having greater flexibility and operational capabilities than prior art devices, and to provide a leak detector which is simpler and less expensive than the prior art devices.

It is a further object of the invention to provide an improved leak detector vacuum pumping station for repetitive operations by unskilled operators in leak detection and similar operations.

Other objects and advantages of the invention will in part, be obvious and will, in part, appear hereinafter.

The invention accordingly comprises an improved leak detector including the combination of parts and subcombinations of parts therein which are described below and in the drawings and the scope of application of which is indicated in the claims.

The invention is now particularly described, including an explanation of the preferred embodiment and best mode of use, known to me with the aid of the drawings wherein:

FIG. 2 is a partly sectional diagram of the spectrometer tube and main pumping system;

FIGS. 2A, 2B and 2E show different operating positions of the apparatus while FIGS. 2C and 2D show two embodiments of a "third" valve used in the apparatus;

FIG. 3 is a partly sectional diagram of the structure of the semi-automatic valve means, including "first" and "second" valves and operating linkage therefor according to a preferred embodiment of the leak detector instrument which I have invented.

FIGS. 3A–3C are diagrams showing different operating positions of the operating linkage apparatus of FIG. 3 and FIG. 3D is an isometric back view of the linkage showing the clutch used therein, the viewing direction for FIG. 3D being indicated by the lines D—D in FIG. 3;

FIG. 5 is a circuit diagram for electrical switching means activated by the linkage.

FIG. 6 is an isometric front view of the valve operating linkage in moving from the FIG. 3A to FIG. 3B position, also showing a preferred specific construction for the linkage diagrammed in FIGS. 3–3C;

FIGS. 7 and 7A show a variant construction of the link connected between the operating handle and air release valve of the apparatus; and FIGS. 7B and 7C show other positions of said link.

FIG. 1

Figure 1:
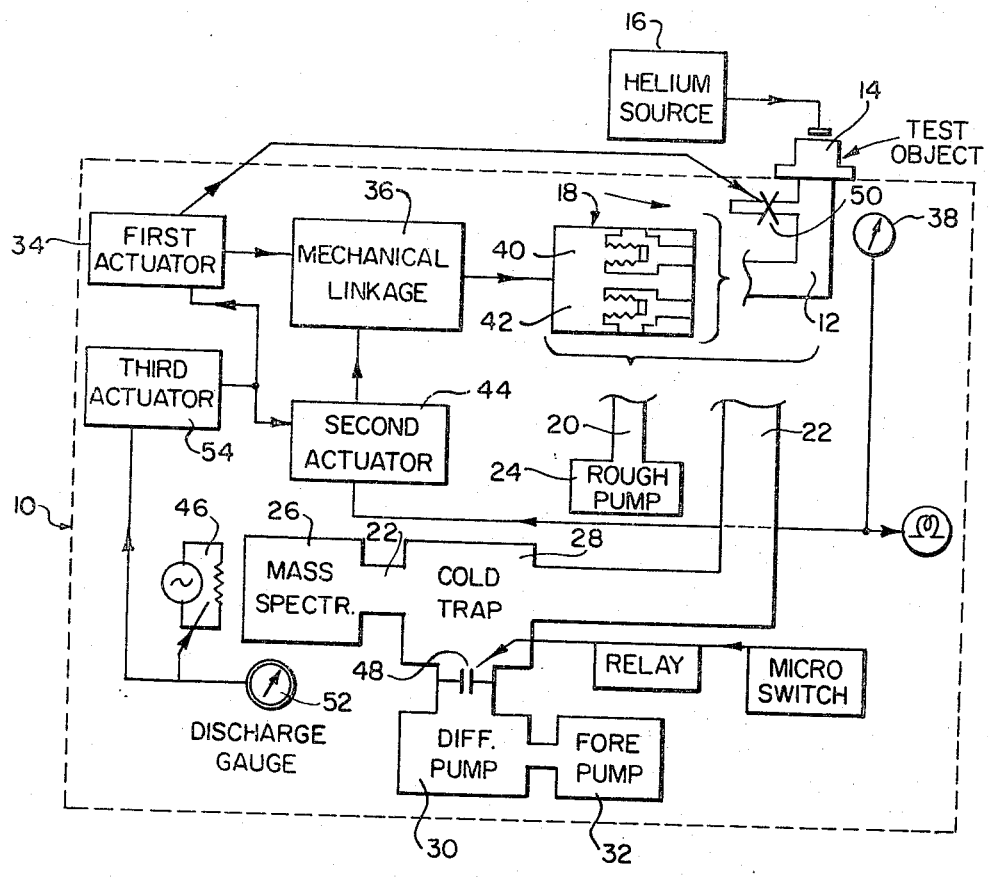
FIG. 1 is a schematic diagram of the leak detector showing the interconnection of its principal parts.

The arrangement of principal components of the leak detector is shown in FIG. 1. The leak detector is housed in a portable test cabinet 10 which has an inlet line 12 for connection to a test object 14. Trace gas from an external source 16 is sprayed on the exterior of the test object and if there is a leak in the test object, the trace gas will enter the inlet 12. The trace gas then passes through a valve system 18. The valve system is connected to first and second outlet lines 20 and 22, respectively. Outlet line 20 is connected to a mechanical roughing pump and outlet line 22 is connected to a mass spectrometer 26 (or other mass sensitive member). During actual leak detecting operations, the valve system generally connects inlet 12 to outlet 22 so that trace gas is fed to the mass spectrometer for analysis.

A main pumping system for the mass spectrometer comprises a liquid nitrogen cold trap 28, a diffusion pump 30 and a forepump 32. The cold trap is interposed in line 22 between the valve system and spectrometer. An auxiliary pumping station is provided for evacuating the test object and inlet line. The auxiliary pumping station comprises the roughing pump 24 and valve system 18.

The principal control means for the valve system is a first control actuator 34. In the preferred embodiment of the invention described below, the control actuator 34 is manually operated. The second control actuator 34 is connected to the valve system via a mechanical linkage 36. A pressure gauge 38 is provided for measuring pressure in the inlet line via a sensing head (not shown). A second control actuator 44, automatically operated in response to preset pressure readings of gauge 38, is connected to the valve system 18 via the mechanical linkage 36.

In the preferred embodiment, the valve system 18 comprises a first valve 40 controlling access to the first outlet line 20 and a second valve 42 controlling access to the second outlet line 22. The valves have the form of metal bellows block valves. These valves are superior to the conventional solenoid valves for purposes of providing repetitive leak tight sealing. The usual sequence of operation is that the linkage is operated by the first control to open valve 40 while valve 42 remains closed. The rough pump then evacuates the inlet 12 and test object 14. When the pressure in the inlet falls to a preset value, gauge 38 signals the second control 44 to close valve 40 while opening valve 42. Test line 12 is then in communication with the mass spectrometer and the actual leak detection operation is conducted by heating the filament 46; activating the mass spectrometer tube 26 electronically; and automatically setting an adjustable throttle 48 to limit the speed of the main pumping station. Helium is injected over the exterior of the test object, as described above, to find any leaks. At the end of the leak detection operation, the operator (or an automatic controller) operates the first control actuator 34 to seat valve 40 and valve 42 (if not already seated). This isolates the inlet line and test object. The first control 34 is also effective to admit air to the inlet via an air release valve 50 to raise the interior of the test object to atmopsheric pressure to permit its unloading and to permit the loading of a new test object.

It will be understood by those skilled in the art that many variations of the inlet line coupling to test objects can be made. For instance, the inlet line can comprise several branches in parallel with a valve for each branch. The test object can be the foreline of a vacuum system under study, such as a space simulation chamber.

The valve means also has provision to handle gross leak operation without saturating the spectrometer member and its main pumping system. The gross leak operation is described below in connection with the explanation of FIG. 2B.

In the event of an emergency break in the vacuum tightness of the leak detector, such as a breakage of the test object while the apparatus is under vacuum or removal of the test object before completion of leak testing, it is essential to isolate the inlet from the spectrometer and its main pumping system. This is accomplished by a cold cathode discharge gauge 52, which, in the preferred embodiment, measures pressure in the spectrometer. (It is also known in the art, for instance, to attach such a gauge to the cold trap to indirectly indicate spectrometer pressure). When an emergency pressure rise is detected, the gauge activates a third control actuator 54 to drive the valves 40 and 42 via the linkage to their closed positions and reset the first and second control actuators 34 and 44.

FIG. 2

The cold trap 28 comprises an internal flask 281 filled with liquid nitrogen and three ports 282, 283, 284. Port 282 is connected to the test object via the valve system 18. Port 283 is connected to the mass spectrometer member 26. Port 284 is connected to the diffusion pump 30. The throttle 48 consists of an orifice plate pivoted for movement between a raised position, as shown, wherein the pump 30 is freely connected to the trap and a dropped position (not shown) wherein the plate blocks the port and flow is defined by the orifice. The plate is held in the raised position by a magnet 481 located outside the trap. When closure of the valve 40 and opening of 42 is complete, magnet 481 is automatically raised by a solenoid 482 and the orifice plate falls into the dropped position.

Typically, the diffusion pump provides an effective speed of 10 liters per second. When the orifice plate 48 is dropped into place, the effective speed is reduced to 3 liters per second. Movement of the linkage 36 to close valve 42 also provides an electrical signal via a microswitch (not shown) to open the circuit of solenoid 482. This drops magnet 481 down to raise the plate 48 from port 284 to allow automatic full recovery of pumping speed.

The pump 30 is an air cooled diffusion pump with an internal baffle 301 and with a cold cap or guard ring 302, as described in Patent 2,919,061 to Power. A blower 303 passes cooling air along the exterior of the pump which is equipped with heat transfer fins. The pump heater 30H is subject to automatic cut off by a pressure switch 305 whenever pressure in the pump foreline rises above a preset safe limit for the diffusion pump oil (e.g. 4 mm. Hg abs.). When the pressure switch 305 cuts off the diffusion pump, it also prevents actuation of the filament of the mass spectrometer 26. Thus, high pressure poisoning of the filament is prevented.

The blower 303 and forepump 32 are driven by a common motor 321. The pump 30 is commercially available under the designation HSA–2–150 and is capable of being roughed through. An isolation valve 306 is provided for cutting pump 30 off from port 284.

The valve system 18 comprises the above-described first and second valves, 40 and 42, and a third valve 60. Valve 60 is a three-way valve and is normally in the position shown in FIG. 2. However, the valve can be turned to the position shown in FIG. 2A for initial evacuation of the spectrometer and main pumping system by roughing pump 24.

The valve can also be turned to the position shown in FIG. 2B for gross leak operation when the gross leak lamp L (FIG. 2) is lighted by failure of the auxiliary pumping station to produce the desired vacuum in a short time. Each time the first actuator moves from the load to test positions, a timer T is started and only the achievement of a pre-set pressure, as indicated by gauge 38, prevents the lamp from lighting. Movement of the first actuator back to load or air release position resets the timer. The FIG. 2B position proportions flow between outlet lines 20 and 22 with the bulk of gas flow pumped out by roughing pump 24 via outlet line 20. Thus, pressure in the mass spectrometer remains at the requisite low level for avoiding filament poisoning. Also helium saturation of the spectrometer is avoided. But a helium probe can be traced over the test object to find the location of the large leak with the aid of the spectrometer. After the location of the gross leak is discovered, the operator returns valve 60 to the position of FIG. 2 and operates control 34 to reset the apparatus for a new load-test cycle.

A preferred (and distinctly advantageous) configuration of valve 60 is shown in FIG. 2C. However, it should be understood that other three-way valves or other valve means (e.g., a pair of one-way valves as shown at 60D in FIG. 2D) can be employed in the combination described.

Referring now to FIG. 2C, the valve 60 comprises a threaded stem 601 which advances a bellows-sealed seat 602, having a cup-like extension 603. Resilient O-rings 604 and 608 are provided for sealing the seat 602 and extension 603 against a valve housing 605. Openings 606 are provided in the extension for making a fluid connection through the extension. The position of the valve seat and extension shown in FIG. 2C corresponds to the valve position shown schematically in FIG. 2E and may be described as the closed position of the valve. The stem 601 (FIG. 2C) is rotated counterclockwise to retract the seat-extension 603 to the left and gradually place outlet 20 in communication with the mass spectrometer, cold trap, etc., diverting only a small portion of flow from outlet line 20. This allows the proportioning operations indicated in FIG. 2B. Further counterclockwise rotation retracts the seat extension sufficiently so that openings 606 are in registry with the lower portion of outlet 22 while the two O-rings 608 straddle the opening to outlet 20. This position is schematically indicated in FIG. 2 and constitutes the "open" position of the valve.

FIG. 3

The first, second and third controls for operating the valve system through the mechanical linkage are outlined in FIG. 3.

The valve system comprises a block for housing first and second valves 40 and 42, and an inlet manifold 181 connected to the inlet line 12. As noted above, the first valve 40 controls the connection of the inlet to a first outlet 20 which leads to the roughing pump and the second valve 42 controls the connection of the inlet to a second outlet 42 which leads to the mass spectrometer and main pumping system. The valves 40 and 42 are identical bellows block valves. The details of valve 40 are similar to those shown in section for valve 42 where it is seen that the valve is actuated through a valve stem 421 and spring 422 and sealed by a metal bellows 423.

The linkage 36 comprises a first toggle joint consisting of pivoted levers 361 and 362. The shaded in pivot is fixed and the other pivots are floating. The joint is arranged to unseat the first valve 40 when the levers are collapsed toward each other by an actuating force applied to the center pivot.

A second toggle joint is provided for actuating the second valve 42. The second toggle joint consists of a pair of pivoted levers 363 and 364, similar to and aligned in parallel with the levers of the first toggle joint. The second joint also comprises a spring 365 for balancing the air pressure differential across valve 42 when the inlet manifold is under vacuum.

The first and second toggle joints are actuated via a third toggle joint consisting of pivoted levers 366 and 367 which are folded towards each other when the first and second joints are extended.

The first control 34 comprises a manually operated lever which is shown in a load position I (although the manifold has been air released by another lever motion described below). The lever is connected to the central pivot of the third toggle joint via a split tie-rod 341. The split tie-rod pieces are pushed apart by a compression spring to provide for actuating the air release valve via a flange 343. The air release valve 50 comprises an extension 501 arranged to be pushed by flange 343 when the handle is pivoted to the position indicated by the chain line III.

The second control 44 comprises a gear motor which is connected to the center pivot of the second toggle joint via a fourth toggle joint consisting of levers 441 and 442. A fixed tension spring 443 is provided to stabilize the fourth toggle joint in its two terminal positions, one of which is shown in FIG. 3.

The third control 54 is a pivoted lever arm tied to spring 365 and adapted ot push control lever 34 from position II to position I when a latch 541 is released. The latch is controlled by a solenoid 542, operated in response to the above-described discharge gauge 52, and is arranged to be reset by the normal operation of control lever 34 from position I to position II.

FIG. 3D shows an isometric back view of the linkage (see viewing lines D—D in FIG. 3). The handle 34 is in the same position as in FIG. 3. The chassis 10 has a vertical plate which separates the linkage from motor 44. Mounted from the chassis is a long bar 445 which carries the motor. The clutch which couples motor 44 to crank 441 consists of a pair of crown gears 449. A long pivoted arm 349 forms an extension of the actuating handle 34. When the handle is in position I, the arm 349 holds bar 445 away from the linkage via a roller 446, thereby decoupling the motor from the linkage. When the operator pulls handle 34 to position II the arm 349 swings upwardly to clear roller 446. A tension spring 448 pulls the bar 445 towards the linkage to make clutch 449. When the handle 34 is returned to position I (or III) the arm 349 again pushes bar 445 away to break clutch 449.

Movement of the arm to its high position closes a switch S-2. A detent 447 changes the position of switch S-3 when the motor rotates the linkage to its test position (FIG. 3B below). Return movement of the linkage to the FIG. 3 position raises detent 447 away from switch S-3 and lowers arm 349 from switch S-2.

*Operation of FIG. 3*

Initially, the valves 40 and 42 are closed, the manifold 181 and inlet 12 are under atmospheric pressure. The control handle is in the load position. The mass spectrometer is under a pressure of less than $10^{-3}$ mm. Hg abs. The main pumping system and the auxiliary roughing pump are operating.

The operator connects an object to be tested to the inlet line 12. Then the operator pulls the handle 34 to the test position (II). As he does so, the first toggle joint is folded inwardly to open valve 40. This position is shown in FIG. 3A. The roughing pump 24 is now connected to the inlet line 12 and evacuates the test object to a pressure on the order of $10^{-2}$ mm. Hg abs.

Movement of the first toggle to the position shown in FIG. 3A activates a timer T through microswitches S-2, S-3 (FIGS. 3D, 5). The timer is set to close the circuit of a gross leak lamp L via a switch S-1 (FIG. 5) after a preset roughing time. If there is a gross leak in the test object, the inlet manifold will not achieve the desired rough vacuum within the preset time. Then the lamp L will glow and the operator can search for the gross leak(s) by probing with helium and operating the valve 60, as described above in connection with FIGS. 2 and 2B.

When there is no gross leak, the desired rough vacuum will be achieved and the pressure gauge 38 will prevent completion of the gross leak lamp circuit through an optical meter relay (FIG. 5) which completes the circuit of motor 44. Motor 44 drives the linkage to the FIG. 3B position and this changes the position of microswitch S–3. In this phase of operation, motor 44 rotates crank lever 441 to fold up the fourth toggle (levers 441, 442). This actuation folds up the second toggle (363, 364) and straightens the first toggle (361, 362), thus closing valve 40 and opening valve 42. The spring 443 is "toggled" through a peak extension during this actuation and is relaxed at the lower limit of motion.

The resultant position is shown in FIG. 3B. The test object is connected to the mass spectrometer and detection of fine leaks can begin. At the end of leak detection operations, the operator pushes the handle 34 from position II back to position I and on to position III. The movement of the lever from II to I brings the linkage back to the arrangement of FIG. 3 and resets the timer T. The springs 402 and 422 are preloaded to consistently apply an adequate seating pressure to valves 40 and 42, respectively (preferably about 35 p.s.i. corresponding to .015 inch O-ring deflection for proper vacuum sealing without permanent deformation). This eliminates the need for any adjustment of the linkage. Further movement of the lever from I to III operates the air release valve 50 to admit air to the manifold 181 and raise the test object to atmospheric pressure. The valves 40 and 42 are securely closed, thus safeguarding the spectrometer and main and auxiliary pumps against the inrush of atmospheric air. The spring 342 causes the lever to be set at-rest at position I after air releasing.

The handle can be moved by the operator at any time from position II to I to over-ride motor 44 and shut down the valves, the resultant position of the linkage being shown in FIG. 3. In the event of an emergency pressure rise affecting the mass spectrometer, the discharge gauge 52 releases the latch 541 via a solenoid 542. The spring 365 and air pressure differential across valve 42 drive the arm 54 forward to push lever 34 and shut down the valves. The resultant position of the linkage is shown in FIG. 3C. Spring 543 provides an initial push to help start the emergency movement of arm 54.

Advantages

Preferred embodiments of the invention, shown, for example, in FIGS. 1–3D are specifically characterized by an improved transition between the rough pumping and leak testing stages of operation. That is, when the desired rough vacuum is achieved, the valve 40 is slowly moved towards its seat while the valve 42 is slowly lifted from its seat. The transition is controlled to a timing of 12 seconds by the selection of a one revolution per minute motor as gear motor 44 (FIG. 3) and by the design of the linkage 36. In prior art devices, the repetitive pumping and air release operations of the leak detector create vacuum problems; e.g., gas trapped under the O-ring of the "test" valve (corresponding to valve 42 of the instant device) is liberated upon opening of the valve and contaminates the leak detector and mingles with the trace gas to decrease sensitivity. The slow transition of the preferred embodiment allows the rough pump 24 to remove a substantial portion of such liberated gases. The above-described structure for accomplishing this gradual transition from the rough pumping to leak tracing stages, and equivalents thereof, therefore constitute a specific feature of the invention for which patent protection is sought commensurate with my contribution to the art. It should be pointed out here that in prior art leak detectors the transition from rought pumping to leak tracing stages is almost instantaneous.

Further improvement is afforded by the combination of the first and second valves with third valve means such as those shown at 60 in FIG. 2 or 60D in FIG. 2D. The third valve allows for testing of gross leaks.

Preferred embodiments of the invention are further specifically characterized by the substantially constant loading on the O-rings of the first and second valves provided, for example, by pre-loaded compression springs (see spring 422, FIG. 3). These springs in combination with the toggle linkage provide the necessary degree of vacuum sealing, cycle after cycle, and prolong O-ring life. The specific location of preload means adjacent the valve heads does not form part of the present invention, but rather is part of the joint invention of Bassan and Briggs. However, such location is preferred for specific embodiments of the present invention.

Preferred embodiments of the invention are further specifically characterized by the arrangement of a first toggle joint, consisting of a pair of pivot arms, between a fixed pivot and the stem of the first valve 40 and a second toggle joint, consisting of a pair of pivot arms, between a fixed pivot and the stem of the second valve 42. The toggle joints, in combination with the above-described actuators and the connecting linkage therebetween, provide a stright reciprocating motion for their respective valves in repetitive vacuum pumping cycles. The arrangement of the toggles to be extended in the valve seating position provides a firm valve seating force in response to a light actuating force on the pivot between the pivoted levers of the toggle.

Preferred embodiments of the invention are further specifically characterized by the orifice plate 48 in combination with the above valve assembly which combination provides high sensitivity compatible with rapid cyclic operation.

Specific embodiments of my invention may omit one or more of the above characterizing features or provide an equivalent substitution therefor and yet exhibit substantial advantages over prior art devices. It is therefore my intent to claim structure which provides any of said characterizing features and the above-stated combinations thereof, and including all uses of the claimed structure, commensurate with my contribution to the art.

FIG. 4.

Figure 4:
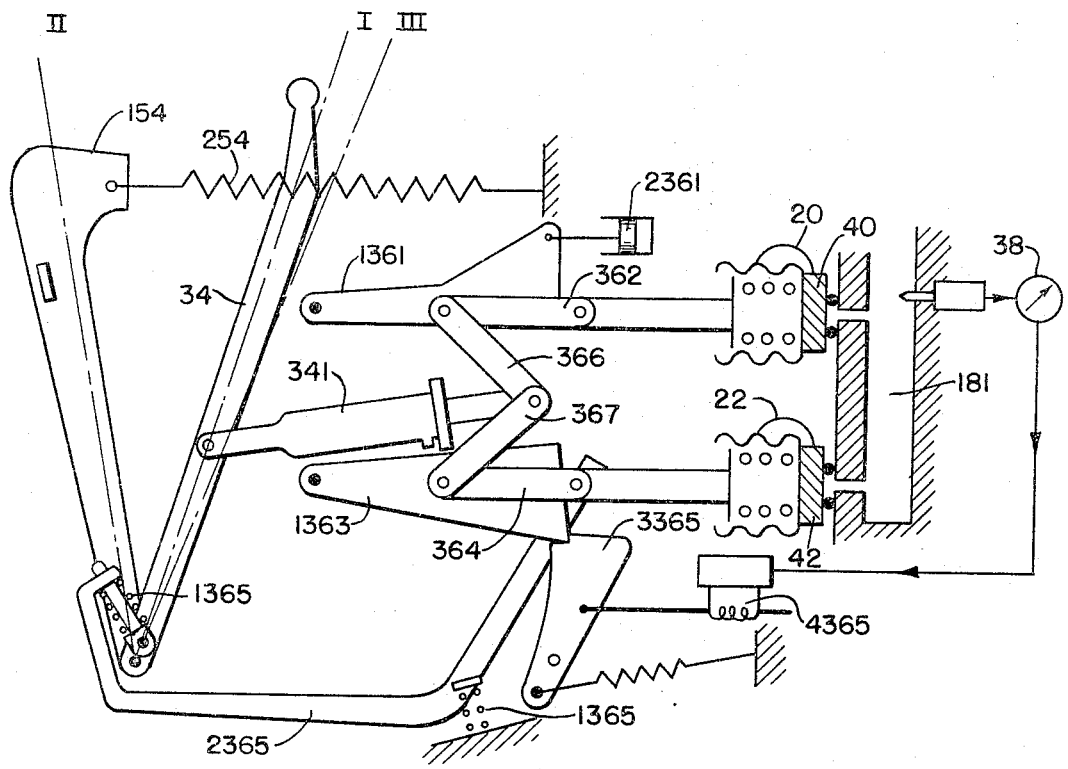
FIGS. 4, 4A, 4B show structure and different operating positions of the semi-automatic valve means including "first" and "second" valves according to a second embodiment.

Referring now to FIG. 4, there is shown a portion of a leak detection instrument according to another embodiment of the invention. As in the preferred embodiment of FIG. 3, described above, the FIG. 4 embodiment has "first" and "second" valves, 40 and 42 respectively, which connect the inlet to the roughing pump and mass spectrometer respectively through first and second outlets 20 and 22.

The valve operating linkage comprises a first toggle joint—levers 1361 and 362; a second toggle joint—levers 1363 and 364; and a third toggle joint—levers 366 and 367. The linkage is connected to a first acutator—lever 34 and link 341; a second actuator—springs 1365 and bar 2365 and latch 3365 operable by a solenoid 4365; and a third emergency actuator—lever 154, spring 254 and a latch for 154 (not shown). The linkage also comprises a dashpot 2361 for opposing the violent action of springs 1365.

An air release valve (not shown) is operable through link 341 by movement of the lever 34 to position III, as in the preferred embodiment described above.

Operation of FIG. 4

Figure 4A:
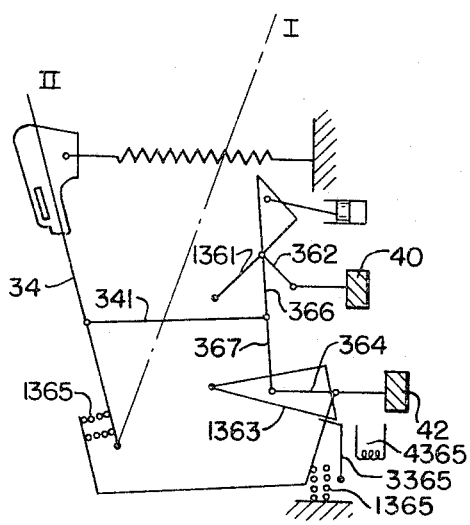
Figure 4B:
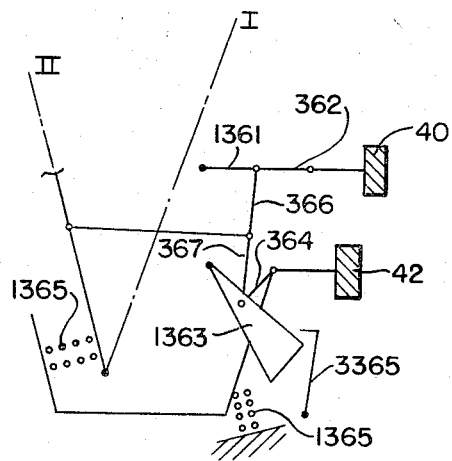

The sequence of operations of the FIG. 4 structure is shown in FIGS. 4, 4A, 4B. The operator after loading, while the handle 34 is in position I, pulls the handle back to position II to produce the linkage arrangement of FIG. 4A. This opens valve 40. The latch 3365 restrains the second toggle joint (1363, 364) and second valve 42 from movement. The movement of the lever 34 from position I to position II arms the springs 1365.

When gauge 38 measures an appropriately low pressure in the inlet, it releases the latch via solenoid 4365. The springs 1365 then collapse the second toggle joint and straighten the first toggle joint via the interconnecting third toggle joint (366, 367), thus seating the first valve 40 and unseating the second valve 42. This spring actuation is opposed by dashpot 2361.

At the end of leak tracing operations, the operator moves lever 34 from position II to III to close valve 42 and air release the inlet. The latch 3365 is reset as lever 1363 moves past it.

In the event of emergency pressure rise, a latch (not shown) which restrains lever 154 is released and spring 254 pulls lever 154 forward to push lever 34 from position II to position I. The next rough pump cycle, wherein lever 34 is pulled back to position II, resets the lever 154 under its latch.

*Electrical Circuitry (FIG. 5)*

Referring now to FIG. 5, there is shown an electrical circuit which is preferably used for implementing the control functions described in connection with FIGS. 1 and 2 and utilizing the timer, relays and microswitches described in connection with FIGS. 1, 2, 3 and 3D. In FIG. 5, the numbering used in previous figures is retained for those components which have already been cited.

The circuit is most readily traced by starting from the bottom of FIG. 5 wherein B and W are the principal A.C. lines connected to a source of unregulated house power. Line W is connected to the motor 44 and line B is connected to the motor via a branch B–1. In order for the motor circuit to close, switch S–2 must be closed. S–2 is the switch already shown in FIG. 3D which is operated by motion of the handle 34, via lever 349. The branch B–1 (FIG. 5) leads to the motor 44 via the optical meter relay O.M. which is controlled by thermocouple gauge 38. In order for the motor to operate, switch S–3 must be in the position shown in FIG. 5. Switch S–3 was shown in FIG. 3D. It will be recalled that the operation of switch S–3 occurs at the end of the second valve opening motion (FIG. 3A to 3B). Until then switch S–3 has the position shown in FIG. 5. After leak detection, closure of the second valve causes switch S–3 to return to its FIG. 5 position. Another requisite for powering the motor 44 is completion of its circuit through the optical meter relay O.M. This occurs when pressure in the inlet line is sufficiently low (as measured by thermocouple gauge 38).

A second branch line B–2 provides power to the timer motor. Once the handle 34 is pulled to close switch S–2, the timer motor starts and, after a preset time, closes switch S–1 to light the gross leak lamp L. Closure of switch S–1 is prevented or terminated when the relay allows operation of the motor and subsequent operation of the switch S–3 away from its FIG. 5 position. The timer motor resets itself whenever its current supply is interrupted.

Movement of switch S–3 to its alternate position also completes a circuit through lines B–3, B–4, W–3 and W to operate the above-described orifice plate control 48 via solenoid 482 and magnet 481. This action places orifice plate 48 in front of the pump opening for high sensitivity testing as described above in connection with FIG. 2. When the switch S–3 is subsequently moved back to its FIG. 5 position, the orifice plate 48 will be removed to allow high speed pumping cleanup of the mass spectrometer 26. The operator has the option not to use orifice plate at all by moving switch S–4 to the OUT position or to use orifice plate at all times by moving switch S–4 to the IN position (the circuit of solenoid 482 is then completed through branch B–5 and B).

A further branch from line B is B–6 which contains the emergency latch release solenoid 542 (see also FIGS. 1, 2, 3 and 3C).

The mass spectrometer member is indicated at 26. The leak signal from the collector electrode of the spectrometer is fed to a leak rate meter via an amplifier circuit and a range switch. Also in series with the leak signal line is a 2 megohm resistor to desensitize the instrument. During actual leak testing the resistor is shorted out by relay K302 in line W–2 or relay K303 in line W–1. It will be understood from the above description that relay K302 will only be energized after motor 44 has moved switch S–3 to complete branch line B–3 and that relay K303 will only be energized in the alternative situation where the timer motor has closed switch S–1.

Shown adjacent the spectrometer is the discharge gauge 52 which provides an emergency signal via relay K101 whenever the measured pressure exceeds a preset value (e.g. 0.2 microns). In the event of such a pressure rise, the relay closes switch S–6 to provide a complete circuit for solenoid 542.

Looking to the lower portion of FIG. 5 a constant voltage transformer is interposed across lines B and W to provide a source of regulated A.C. via output lines G and V. This regulated A.C. is used for energizing the electronic circuits of the mass spectrometer, the heater 30H of diffusion pump 30 and the thermocouple gauge 38. A pressure switch 305 in the diffusion pump foreline and the above relay K101 provide the basic safety controls. The pressure switch opens switches S–5, S–7, S–8 in response to overpressure. This cuts off the diffusion pump heater directly (S–5), cuts off power to filament 46 indirectly (S–5 via relay K304, S–8 relay K102 and S–9). Another control for filament power is provided by the discharge gauge 52 via relays K101 and K102. Whenever current through line V–2 is interrupted, the line stays open until relay K102 is again energized. This cross control provides complete safety for the mass spectrometer. Normally, an overpressure condition is signaled and filament power is cut off via gauge 52 via relay K101, S–10, K102, S–9. However, a very rapid pressure rise such as caused by breakage of a glass test object may cause the gauge 52 to be extinguished before it can respond. In this case, when the pressure rise reaches the foreline of the diffusion pump, the pressure switch will cut off the filament via S–5, K304, S–8, K102, S–9. Similarly, the operation of emergency solenoid is alternatively initiated by a pressure signal from gauge 52 (via relay K101, S–6) or pressure switch 305 (via relay K304, S–7).

*Mechanical improvements (FIG. 6)*

FIG. 6 is a front isometric view of the preferred embodiment of the valve linkage shown diagrammatically in FIGS. 3, etc. FIG. 6 indicates the linkage in the position going from load to test positions (from FIG. 3A to FIG. 3B) with the first valve 40 closing and the second valve 42 opening. Each lever arm of the first, second and third toggle joints is defined by a pair of identical links distributed symmetrically about the plane of valving motion. These features, together with the use of long bearings for the valve stems 401, 421 and the preloaded springs 402, 422 further improve the reliable operating life of the linkage. A linkage of this design subjected to life test went through 900,000 cycles without any parts failure except for metal bellows. This preferred construction is described in the above-cited application of Briggs and Bassan.

FIG. 7

In connection with the valve linkage 36, the above discussion in connection with FIG. 3 cited the split construction of tie-rod 341 which allows the motion of handle 34 from position II to position III, thus actuating air release valve 50 via link 501 and then "bounce" back to position I—the load position. This happens whether the movement of the lever 34 is under the influence of the operator or under the influence of the emergency lever 54. In some overpressure situations it is not desirable to air release the valve manifold 181. FIG. 7 shows a variation of the FIG. 3 air release valve linkage which guides the operator in air releasing. The design of this variation must be credited to P. R. Fruzzetti of National Research Corporation.

The handle 34 is connected to the toggle linkages via a split tie rod 341, as in FIG. 3. However, the design of flange 343 is varied as shown in FIG. 7 by the addition of a detent cam operator 344 with a side-arm 345 as shown in FIG. 7A. A cam 502 is pivotally mounted on the chassis of the instrument and is arranged to lift the actuating link 501 out of the path of the flange 343. When the handle 34 moves from position II to III, the detent 344–345 strikes the lower leg 503 of the cam, thus causing the cam to rotate to the position shown in FIG. 7B. The link 501 falls on top of the flange 343 (FIG. 7B), and the valve manifold remains under vacuum.

Thhe operator may wish to go ahead and air release. He does this by pushing the handle 34 back to position I to clear the flange 343 and let link 501 drop (FIG. 7C). Then the operator pushes the handle 34 to position III to air release. After the operator air releases and lets go of handle 34, the spring 342 in the tie rod then "bounces" the handle back to position I and the orientation of the cam is the same as in FIG. 7C. In the next roughing cycle when the handle 34 is pulled to position II, the detent 344–345 (FIG. 7) strikes leg 504 of the cam, thus raising link 501 out of the path of flange 343 and resetting the mechanism.

Several variations can be made from the above-described embodiments without departing from the scope of the invention herein. It is therefore intended that the subject matter of this specification and the drawings are to be read as illustrative and not in a limiting sense.

What is claimed is:

1. A leak detector having an inlet line connected to a vacuum roughing pump through a first outlet line and first valve means and connected to a mass sensitive member through a second outlet line and second valve means, means for connecting the inlet line to an hermetically sealed test system, a first toggle joint connected to the first valve means, a second toggle joint connected to the second valve means, each toggle joint having a direction of motion which opens a valve associated with the linkage and a direction of motion which closes the valve, first actuator means for operating the first toggle in the valve opening direction and for operating both toggles in the valve closing direction, second actuator means for simultaneously operating the first toggle in the valve closing direction and the second toggle in the valve opening direction, means for automatically operating the second actuator means in response to the completion of rough vacuum pumping of the inlet line.

2. The leak detector of claim 1 further comprising means for indicating a gross leak and third valve means for diverting a small portion of gas flow from said first outlet line to the second outlet line downstream of said first and second valve means.

3. The leak detector of claim 1 further comprising a third actuator responsive to gas pressure in the mass sensitive member, to over-ride said first and second actuator means and operate said first and second valve means to block off the connection from the inlet to the mass sensitive member.

4. The leak detector of claim 1 wherein the first actuator means comprises a control handle connected to the first and second toggles by a third toggle interconnecting the first and second toggles and adapted to spread the first and second toggles when the handle is moved from a load to a test position.

5. A leak detector comprising, in combination, a mass sensitive member, a main vacuum pumping system connected to said member, an auxiliary vacuum pumping station, an inlet line connected to said member through the pumping station, the pumping station comprising a roughing pump and valve means having first, second and third operative arrangements for selectively and sequentially connecting the inlet line to the roughing pump in said first operative arrangement (FIG. 3A) and then breaking the connection of inlet line to roughing pump and connecting the inlet line to said mass sensitive member and said main vacuum pumping system in said second operative arrangement (FIG. 3B) and then blocking the connection of the inlet line to both said rough pump and mass sensitive member in said third operative arrangement (FIG. 3 or 3C), and means for selectively limiting the speed of the main pumping system without disturbing the connection between the inlet line and mass sensitive member, and means for automatically over-riding the speed limiting means to restore full speed after completion of the leak detection operation.

6. The leak detector of claim 5 wherein the main pumping system comprises a cold trap with separate connections to the mass sensitive member, the rest of the main pumping system and the auxiliary pumping station, the said means for limiting the main pumping system comprising a throttle for selectively blocking the connection to the rest of the main pumping system, throttle control means comprising a magnet operatively connected to the throttle for controlling the position of the throttle and a solenoid operatively connected to the magnet for controlling position of the magnet, the solenoid also being connected to said valve means for automatically applying the said throttle during leak detection operation, as indicated by the valve means being in its said second operative arrangement, and removing said throttle during air release and rough pumping operations of the leak detector, as indicated by the valve means being in its first or third operative arrangement.

7. A semi-automatic vacuum pumping station for use in repetitive vacuum pumping operations, such as leak detection and the like, comprising, in combination, a manifold, an inlet port for connecting said manifold to a region to be evacuated, a first outlet from said manifold connected to a roughing pump, a second outlet from said manifold connected to a high vacuum zone, a first bellows sealed valve for blocking said first outlet, a second bellows sealed valve for blocking said second outlet, a first toggle joint connected to said first valve, a second toggle joint connected to said second valve, means interconnecting said first and second toggle joints, a first actuator connected to both said toggle joints via said interconnecting means, the first actuator being moveable between at-rest and operating positions, the toggle joints and interconnecting means being constructed so that movement of the actuator from its operating to at-rest positions seats both valves, means for restraining the second toggle joint so that movement of the actuator from its at-rest to operating positions unseats the first valve, means for automatically seating said first valve and unseating said second valve at a predetermined interval after movement of the first actuator from its at-rest to operating positions and means for admitting gas to the manifold to raise its pressure to atmospheric.

8. The apparatus of claim 7 further comprising means for automatically moving the control actuator to its at-rest position in response to a signal indicating emergency pressure rise in the high vacuum zone.

9. The apparatus of claim 7 wherein the first actuator controls said gas admitting means by movement from said at-rest position to a third position.

10. The apparatus of claim 7 wherein the said interconnecting means comprises a fourth toggle joint, each of the first, second, third and fourth toggle joints consisting of a pair of pivoted levers pivotally connected together at a central pivot, the levers of each of the first and second toggle joints being connected between a fixed pivot and their associated valve and folding towards each other for the valve unseating position, the third toggle joint being connected between the central pivots of the first and second toggle joint and the fourth toggle joint being connected between the rotary drive and the central pivot of the second toggle joint.

11. The apparatus of claim 10 wherein the means for unseating the second valve and seating the first valve comprises a speed reduction rotary drive connected to said second toggle joint via a fourth toggle joint.

12. The apparatus of claim 7 wherein the means for unseating the second valve comprises a rotary motor connected to said second toggle joint via a separate toggle joint.

13. The apparatus of claim 12 wherein the motor is mounted on a moveable support member, means connecting said first actuator and the moveable member for moving the member in response to operation of said first actuator, the motor having a coupling to the linkage which is made and broken via movement of said moveable member.

14. A leak detector comprising, in combination,
(a) a mass spectrometer member connected to a cold trap and a diffusion pump having a separate connection to said cold trap, an orifice plate for blocking said separate connection to limit the gas conductance thereof,
(b) a mechanical pump,
(c) an inlet line for connection to a test object,
(d) a first outlet line connected to said inlet line and said mechanical pump (b),
(e) a second outlet line connected to said inlet line and to said cold trap through a connection separate from said spectrometer and diffusion pump connections,
(f) a first bellows sealed valve controlling flow through the first outlet line and comprising a pre-loaded spring and an operating stem,
(g) a second bellows sealed valve controlling flow through the second outlet line and comprising a preloaded spring and an operating stem,
(h) first operating means connected to said first and second valves and comprising a first toggle joint connected to said first valve, a second toggle joint connected to said second valve, and a third toggle joint connected between floating pivot points of said first and second toggle joints, a control lever connected to said third toggle joint,
(i) second operating means comprising an actuator connected to said second toggle joint and the second toggle joint being constructed and arranged so that operation of the said control lever from loading to leak detection positions moves the first and third toggle joints, while the second toggle joint is restrained and means for overcoming said restraint to initiate the actuator to move the second toggle joint and the first and third toggle joints therewith,
(j) means responsive to low pressure in the inlet for placing the orifice plate in blocking position and for initiating operation of said means for initiating said actuator.

15. A leak detector according to claim 14 wherein the means (j) comprises an actuator which is operatively connected to the linkage (h) (i) for actuation by the movement of said linkage which opens the second valve (g).

16. A leak detector comprising, in combination, (a) a mass sensitive member and a main pumping system for said mass sensitive member comprising a high vacuum trap connected to said member and a high vacuum pump connected to said trap and means for automatically limiting the speed of said high vacuum pump,
(b) an auxiliary pump for rough vacuum operation,
(c) an inlet for connection to a test object,
(d) a first outlet line connected to said inlet and said roughing pump,
(e) a second outlet line connected to said inlet and to said member and main pumping system,
(f) a first valve controlling flow through the first outlet line,
(g) a second valve controlling flow through the second outlet line,
(h) first operating means comprising first, second and third toggle joints, each joint comprising a pair of pivoted lever arms with a common pivot, the third toggle joint being connected between the common pivots of said first and second joints, the first and second toggle joints being connected to the first and second valves, respectively, and being constructed and arranged so that straightened positions of the levers of said joints correspond to the flow cut-off positions of said valves, and a first control actuator connected to the common pivot of said third toggle joint, the lever arms of the third toggle joint having a collapsed position corresponding to the straightened positions of the first and second joints and having a straightened position corresponding to collapsing of the lever arms of either of the first and second joints,
(i) second operating means comprising a second actuator connected to the second toggle joint, which is ineffective to move the joint when straightened but moves the joint after initial collapse of the lever arms thereof, and a speed limited servomotor connected to the second toggle joint through a fourth toggle joint for initially collapsing the second toggle joint and slowing the action of the second actuator, and
(j) means responsive to low inlet pressure for initiating operating of both said means for automatically limiting the speed of said high vacuum pump and said second operating means, and means responsive to closure of the second valve to end operation of said means for automatically limiting speed of the high vacuum pump.

References Cited

UNITED STATES PATENTS 3,026,715 3/1962 Briggs _____ 73—40 X
3,031,884 5/1962 Martin _____ 73—40

LOUIS R. PRINCE, *Primary Examiner.*

J. NOLTON, *Assistant Examiner.*